US006036871A

United States Patent [19]

Eichler

[11] Patent Number: 6,036,871

[45] Date of Patent: Mar. 14, 2000

[54] METHOD AND DEVICE FOR SEPARATING HEAVIER FROM LIGHTER PARTS OF AQUEOUS SLURRIES BY MEANS OF CENTRIFUGAL FORCE EFFECTS

[75] Inventor: Dietrich Eichler, Grosskarolinenfeld, Germany

[73] Assignee: Fan Separator GmbH, Oelde, Germany

[21] Appl. No.: 09/177,597

[22] Filed: Oct. 23, 1998

Related U.S. Application Data

[63] Continuation of application No. PCT/EP97/01913, Apr. 17, 1997.

[30] Foreign Application Priority Data

| | | | |
|---|---|---|---|
| Apr. 25, 1996 | [DE] | Germany | 196 16 602 |
| Jun. 26, 1996 | [DE] | Germany | 196 25 456 |
| Nov. 11, 1996 | [DE] | Germany | 196 46 494 |

[51] Int. Cl.$^{7}$ ........ B01D 21/26

[52] U.S. Cl. ........ 210/787; 210/788; 210/512.1; 210/512.3

[58] Field of Search ........ 210/512.1, 512.3, 210/220, 787, 788

[56] References Cited

U.S. PATENT DOCUMENTS

| | | | |
|---|---|---|---|
| 2,701,642 | 2/1955 | Goodwin . | |
| 2,996,187 | 8/1961 | Payne . | |
| 3,630,498 | 12/1971 | Bielinski . | |
| 4,397,741 | 8/1983 | Miller . | |
| 5,229,014 | 7/1993 | Collins | 210/787 |
| 5,300,222 | 4/1994 | Broussard, Sr. | 210/202 |
| 5,316,685 | 5/1994 | Stein | 210/787 |
| 5,470,465 | 11/1995 | Moorehead et al. | 210/205 |

FOREIGN PATENT DOCUMENTS

| | | |
|---|---|---|
| 0 186 021 | 10/1990 | European Pat. Off. . |
| 0447 877A1 | 9/1991 | European Pat. Off. . |
| 3390449 | 8/1984 | Germany . |
| 37 33 583 A1 | 4/1989 | Germany . |

*Primary Examiner*—W. L. Walker
*Assistant Examiner*—Marianne S. Ocampo
*Attorney, Agent, or Firm*—Griffin, Butler, Whisenhunt & Szipl, LLP

[57] ABSTRACT

The invention relates to a process and apparatus for the separation of heavier from lighter fractions in aqueous slurries by means of centrifugal force. A slurry is made to spin in a separation chamber under influence of differential pressure. The differential pressure, which can amount to several bars, is generated by means of a pressure increasing stage in the form of a transport rotor device (20) which acts in conjunction with a stator arrangement (22). This pressure boosting stage takes place immediately upstream of an inlet of the slurry into the separation chamber (4). Rotor blades of a cyclone rotor device (10) and rotor blades of the transport rotor device (20) can be mounted on the same rotary shaft (5). The separation of floatable fractions in aqueous slurries can be enhanced by presence of micro gas bubbles introduced into the separation chamber (4). The separated floatable fractions can be removed from the gas bubbles to which they adhere by means of an anti-foaming device driven by the rotary shaft (5) of the transport rotor device (20).

13 Claims, 6 Drawing Sheets

METHOD AND DEVICE FOR SEPARATING HEAVIER FROM LIGHTER PARTS OF AQUEOUS SLURRIES BY MEANS OF CENTRIFUGAL FORCE EFFECTS

This application is a continuation of international application No. PCT EP97/01913, filed 17 Apr. 17, 1997 now WO 97/40944, published Nov. 6, 1997.

BACKGROUND OF THE INVENTION

The invention relates to a method and a device for separating heavier from lighter parts of aqueous slurries by means of centrifugal force effects.

The invention more particularly relates to a cleaning of liquid slurries having a solid particle fraction below a certain dimension, i.e. to a subsequent cleaning of slurries which have already been subjected to precleaning for removal of coarse particles by screens or the like.

In separation by means of centrifugal separators or hydrocyclones a precleaned slurry is introduced at high velocity into a separating chamber to cause an intensive rotating laminary field of flow to form in the latter so that the heavier parts of the slurry are forced by centrifugal force effects to an outer diameter path, whilst the lighter parts of the slurry preferably collect in the vicinity of the longitudinal centerline of the separating chamber. In a known centrifugal separator (U.S. Pat. No. 2,996,187) the pressure gradient necessary for the flow of the slurry between the inlet and outlet of the separating chamber is produced by a suction transport rotor means provided downstream of the outlet of the separating chamber. The pressure gradient between the inlet and outlet is thus determined by the suction force of the suction transport rotor means and this suction force is in turn defined by the liquid column existing on the suction side so that by means of the suction transport rotor means a pressure gradient of only less than 1 bar can be created. The prior centrifugal separator can thus be used only for suspensions in which a sufficient separation effect is attained even at relatively low rotational speeds of the slurry. To treat parts of aqueous slurries less easy to separate, higher rotational speeds are needed in the separating chamber to generate correspondingly high centrifugal forces. This would necessitate a pressure gradient of a few bars which cannot be produced by known centrifugal separators so that in general several small dimensioned centrifugal separators would need to be arranged in series to arrive at a desired separation rate. This makes the procurement and operating costs of the separation plant substantially more expensive and increases its maintenance frequency. In addition, the thruput of small-dimensioned centrifugal separators is relatively low so that the application of systems equipped therewith is restricted to specific cases of application.

One problem especially involved is to effectively separate floatational particulate material from aqueous slurries by means of centrifugal force effects. It has been proposed (U.S. Pat. No. 4,397,741) for floatational separation to additionally introduce a gas into the slurry circulating in a separating chamber to produce bubbles of gas to which the separated heavier fractions of the slurry tend to adhere due to interfacial effects. The gas bubbles form, so-to-speak, buoyancy bodies so that the heavier fractions not only collect preferably in the vicinity of the longitudinal centerline of the separating chamber but can also be drawn off against the gravitational effect. The effectiveness of this known device is, however, low since the efficiency of separation is based solely on a tangential introduction of the slurry into the separating chamber, i.e. means of boosting the pressure gradient being totally absent and, in addition to this the gas bubbles achievable by the known means have too large a dimension.

SUMMARY OF THE INVENTION

An object of the invention is to provide a method and device of the aforementioned kind which can create high rotational speeds necessary to enable slurries of all kinds including those having floatational fractions to be treated in a highly effective manner.

It has been surprisingly found that the problems associated with known centrifugal separators can be eliminated simply, without any substantial complication of the system, by pressurizing the slurry immediately prior to its introduction into the separating chamber thereby a pressure gradient of a few bars needed for high rotational speeds can be created. Accordingly in a method according to the invention for separating heavier from lighter parts of aqueous slurries by means of centrifugal force effects, the slurry under the influence of a pressure gradient existing between an inlet and outlet of a cyclone separating chamber is caused to execute a circulating movement in said separating chamber so that the lighter parts separate from the heavier parts of the slurry, and the heavier and lighter parts are separately discharged from the separating chamber, wherein the pressure gradient is produced by a pressure boosting stage substantially immediately prior to the introduction of the slurry into said separating chamber.

In accordance with another aspect of the invention a centrifugal separator device for separating heavier from lighter parts of aqueous slurries by means of centrifugal force effects includes a separating chamber, a means for generating a pressure gradient between an inlet and outlet of said separating chamber so that said slurry is caused to execute a circulating movement in said separating chamber, a means for discharging from the separating chamber the lighter parts, and a means for discharging from the separating chamber the heavier parts of the slurry, wherein for generating a pressure gradient a transport rotor means rotatably driven about an axis of rotation is provided in a top-mounted housing of the separator device, said transport rotor means cooperating with a stator means provided directly upstream of the inlet to the separating chamber and having a radial dimension which is greater than the radial dimension of the separating chamber adjacent the inlet to expose the slurry to an overpressure substantially directly prior to its introduction into the separating chamber. Accordingly a transport rotor means is provided upstream of the inlet which functions as a kind of radial accelerator and cooperates with a stator means which converts the kinetic energy, introduced into the slurry by the transport rotor means, into pressure energy. As a result of this it is assured that at the inlet end of the separating chamber a sufficient gradient overpressure is always exerted on the slurry which is independent of a flow pressure in a conduit via which the slurry is supplied to the centrifugal separator and also independent of the level of a liquid column between the inlet and outlet of the separating chamber. As a result of this an increased rotational speed having a correspondingly increased rate of separation is produced. Due to an effective separation being mostly independent of the dimensions of the centrifugal separator seperators, having larger dimensions or greater diameters than in known systems can be put to use with correspondingly favorable effects on the operating and procurement costs.

The improvements in the efficiency of separation achieved by providing a transport rotor/stator means close to the inlet of the separating chambere can be further enhanced when in accordance with an embodiment of the invention additional rotative energy is introduced into the slurry present in the separating chamber. This may be achieved by arranging in the separating chamber a cyclone rotor means which may be driven by the same axis of rotation as that of the transport rotor means. The cyclone rotor means permits increased rotational speeds of the slurry introduced into the separating chamber free of turbulence and independent of the nature of the slurry, in which the counterpressure exerted by the cyclone rotor means being overcome by the pressure exerted on the slurry by the transport rotor means at the inlet side.

As a result of the means as described the invention is particularly suitable for the floatational separation of slurries otherwise difficult to separate by means of centrifugal force effects, e.g. for removing printing ink remainders from waste paper sludges. One further embodiment of the invention in this respect thus provides for separation of the slurry in the presence of gas bubbles, preferably in the presence of microgas bubbles. For this a liquid saturated with microgas bubbles is introduced into the separating chamber for mixing with the slurry, or the slurry itself is gasified and introduced into the separating chamber in a gasified condition. A foam destroying means having impellers suitable for rotational drive arranged in a top-mounted housing of the centrifugal separator spaced from the transport rotor means can be provided to separate by means of the centrifugal effect the foreign matter adhering to the gas bubbles in a foaming mixture of gas bubbles and foreign matter discharged from the separating chamber and to discharge it separately to the environment.

As a summary a centrifugal separator device in accordance with the invention features a relatively uncomplicated structure by all of the cited rotor means permitting arrangement on a common rotary shaft. In addition, the centrifugal separator device has a suction effect and can thus be simply integrated without additional pumping assemblies in a flow system as the driver for a slurry to be treated.

The invention will now be described in more detail on the basis of embodiments thereof and with reference to the drawing.

DETAILED DESCRIPTION OF THE DRAWING

Figure 1:
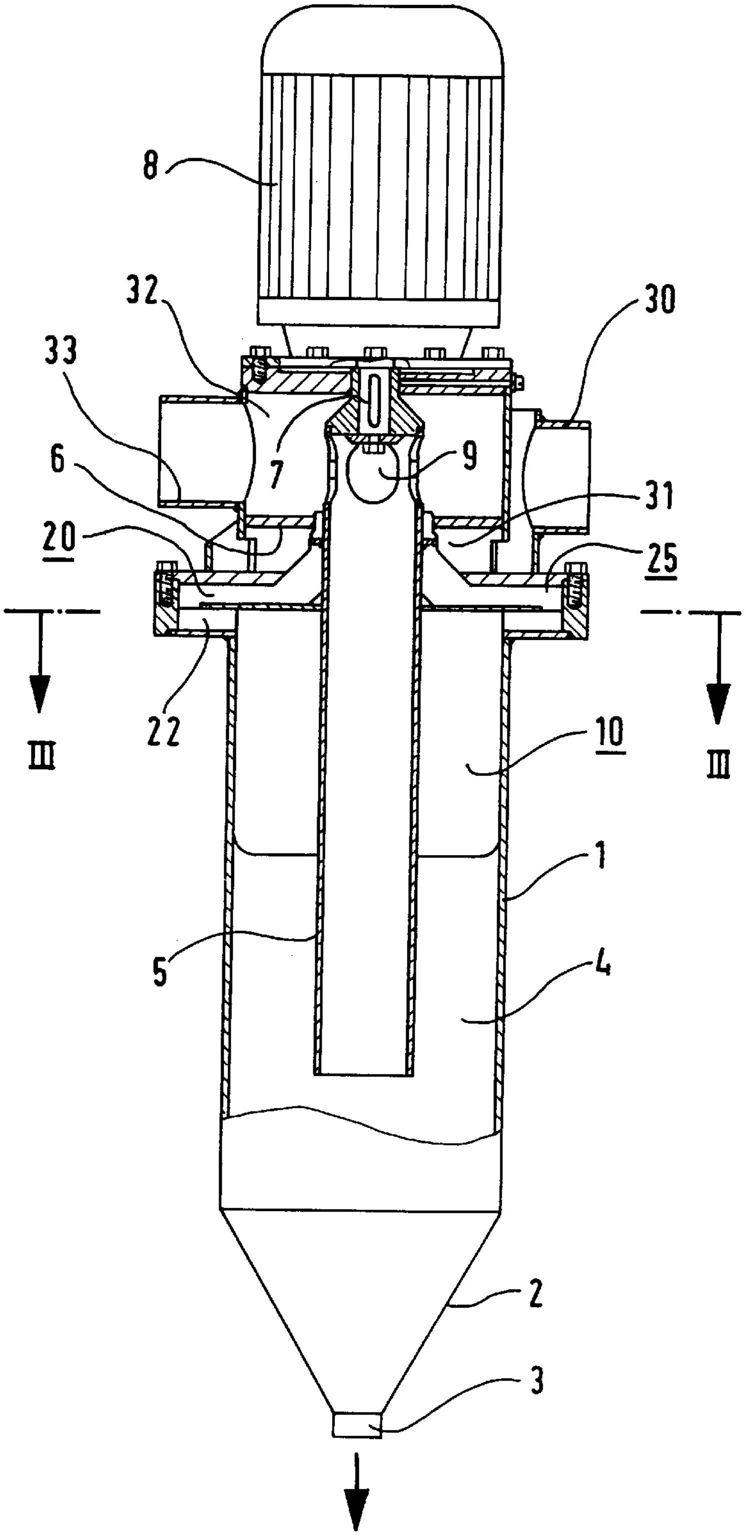
FIG. 1 is a partial longitudinally sectioned view of a centrifugal separator in accordance with a preferred embodiment of the invention.

In the following, reference is made to FIGS. 1, 2A–2C and 3 showing a centrifugal separator in accordance with the invention. Reference numeral 1 in FIG. 1 identifies a tubular cylindrical housing translating into a funnel-shaped bottom portion 2 which tapers into a discharge opening 3 at the lower end. The housing 1 cyclone a separating chamber 4 into which a hollow shaft 5 protrudes coaxial to the longitudinal centerline, this hollow shaft ending by its lower axial open end suitably spaced away from the plane as from which the funnel-shaped portion 2 extends downwards.

At the upper axial end of the hollow shaft 5 protruding from the housing 1 a coupling means 7 is provided which is connected to a drive means 8, e.g. in the form of an electric motor to cause the hollow shaft 5 to rotate at a suitable rotational speed.

In the embodiment of the invention shown the hollow shaft 5 is supported solely by the drive means 8 free of any bearings. If desired, a suitable bearing assembly may be provided to support the hollow shaft 5 relative to the housing 1.

Figure 2B:
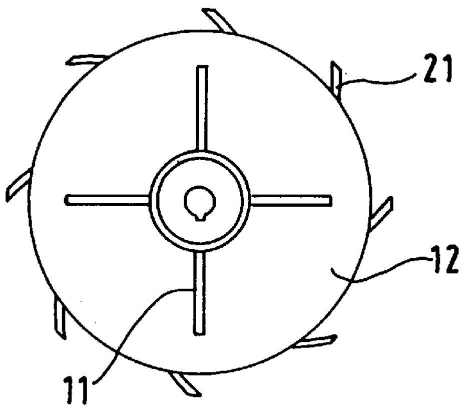
FIGS. 2A–2C show a detail of the centrifugal separator shown in FIG. 1 in an overall view (FIG. 2A), a view from underneath (FIG. 2B) and a view from above (FIG. 2C)
Figure 2A:
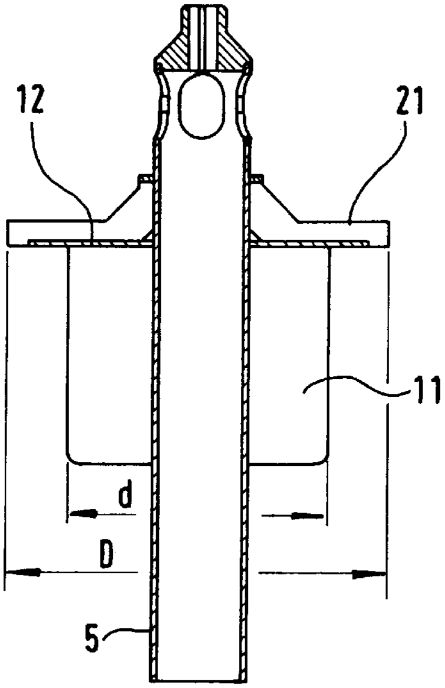
Figure 2C:
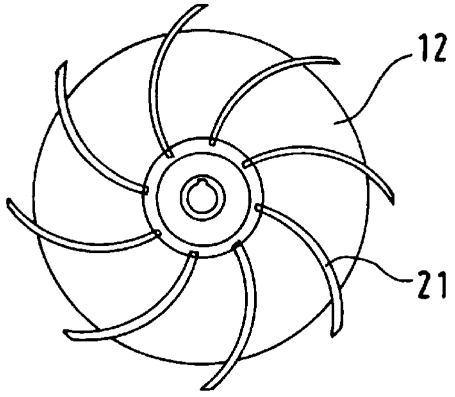

As shown in FIGS. 2A and 2B a mounting plate 12 is secured, e.g. by welding, to an intermediate axial position of the hollow shaft 5, this mounting plate surrounding the hollow shaft 5 in a radial plane. On the underside of the mounting plate 12 a plurality of impellers 11 is secured equispaced from each other angularly which protrude from the hollow shaft 5 radially outward up to the vicinity of the inner circumference of the housing 1. In the embodiment shown four impellers 11 are provided. However, more or fewer such impellers may also be provided.

The impellers 11 form a cyclone rotor means, identified in FIG. 1 generally by the reference numeral 10, which causes a fluid slurry introduced into the separating chamber 4 to positively perform a circulating movement along the inner wall of the housing 1. Due to the centrifugal forces occuring the heavier fractions of the slurry are prompted to collect in the vicinity of the inner wall of the separating chamber 4, whilst the lighter fractions gain access internally into the hollow shaft 5 from where they can be discharged to the environment as will be explained in more detail further on.

As further shown in FIGS. 1, 2A to 2C a plurality of impellers 21 is secured to the upper side of the mounting plate 12, these impellers extending from the hollow shaft 5 substantially spirally and radially outwards to a point at a distance D spaced from the longitudinal centerline of the hollow shaft 5 which is greater than the diameter d of a circular arc described by the outer ends of the impellers 11 of the cyclone rotor means 10 or of the radial dimension of the separating chamber 4. The impellers 21 may, as illustrated, protrude by a suitable short dimension beyond the outer circumferential edge of the mounting plate 12. Preferably, the ratio D:d is between 1.25:1 to 1.75:1, most preferably approximately 1.50:1.

Figure 3:
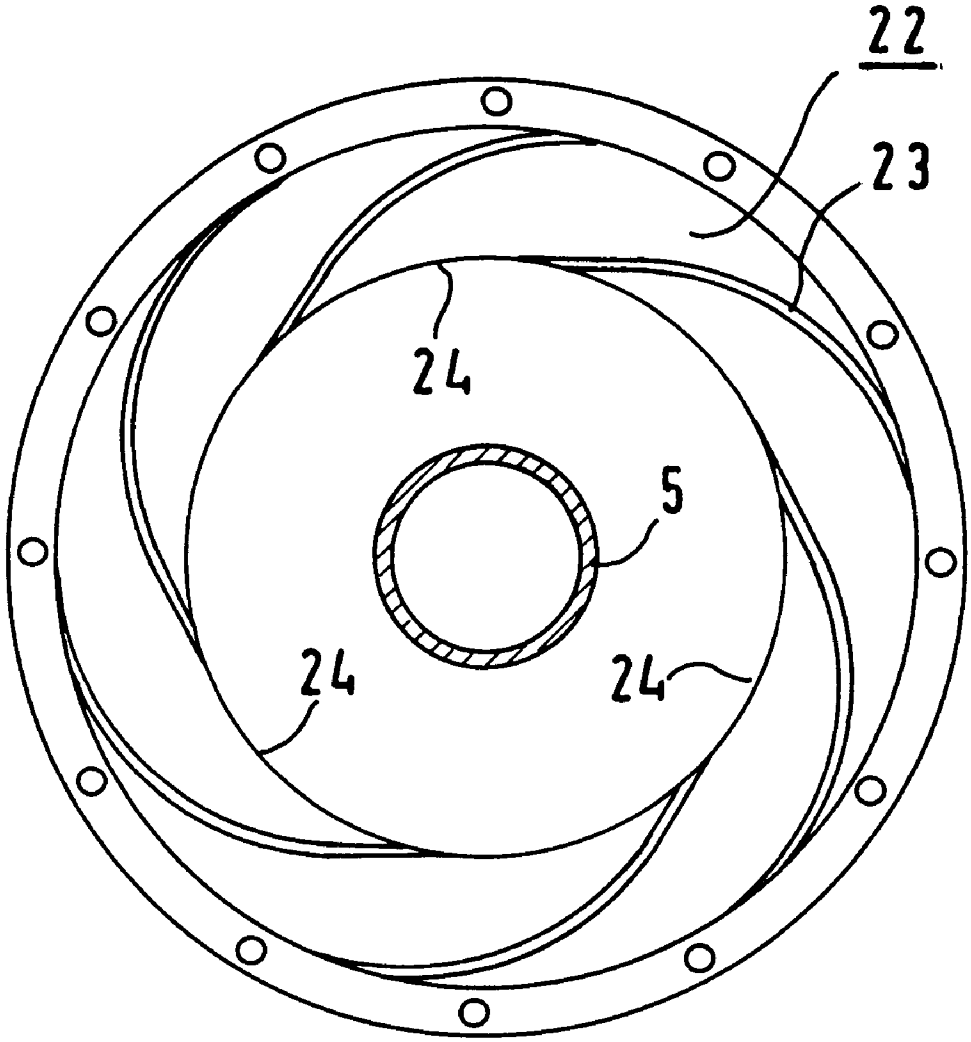
FIG. 3 is a sectioned view along the section line III—III in FIG. 1.

The impellers 21 are part of a transport rotor means identified generally in FIG. 1 by the reference numeral 20 and cooperating with a stator means 22 which is shown in more detail in FIG. 3.

The stator means 22 comprises a plurality of stationary guide elements 23 extending in a radial plane below the plane of the impellers 21 of the transport rotor means 20, preferably spirally from a radially outward location corresponding to the dimension D in FIG. 2A to a radially inward location which substantially agrees with the inner circumference of the housing 1. The guide elements 23 are oriented by their internal end portions preferably substantially tangential to the inner circumference of the housing 1. Between adjacent guide elements 23, passages 24 are defined via which the slurry is able to gain access to the separating chamber 4. The guide elements 23 of the stator means 22 protrude like the impellers 21 of the transport rotor means 20 outwardly beyond the circumferential edge of the mounting plate 12 so that between the stator means 22 and the transport rotor means 20, a fluid communication is created.

As it becomes further evident from FIG. 1 the radial outer portions of the impellers 21 of the transport rotor means 20 and guide elements 23 of the stator means 22 are accommodated in a flange-shaped chamber 25 configured in a top-mounted housing arranged above the housing 1, said top-mounted housing being generally identified by the reference numeral 6.

The stator means 22 has the purpose of decelerating a rotating speed of the slurry produced by the transport rotor means 20 as a result of which the slurry is subjected to an overpressure before gaining access tangential via the passageways 24 to the separating chamber 4 and to the influencing zone of the cyclone rotor means 10 where it is forced to execute a circulating movement by the cyclone rotor means 10. The rotating speed of the slurry in the separating chamber 4 is dictated by the active surface area and rotating speed of the impellers 11 of the cyclone rotor means 10, by the throughout and by the tangential entry of the slurry into the separating chamber 4.

In the above embodiment the cyclone rotor means 10 and transport rotor means 20 are mounted on the same hollow shaft 5 as the drive shaft so that they rotate at the same speed. If desired, separate drive shafts for the cyclone rotor means 10 and the transport rotor means 20 may be provided for operating the two means at differing speeds.

As shown in FIG. 1, the slurry is introduced via an inlet port 30 into a prechamber 31 of the top-mounted housing 6, this prechamber being connected to the transport rotor means 20.

The lighter fractions of the slurry separated by the effect of the cyclone rotor means 10 are caused by the pressure gradient created by the transport rotor means 20 to flow into the hollow shaft 5 and leave the hollow shaft 5 via a plurality of openings 9 configured in the vicinity of the upper end in the hollow shaft 5. From here, the lighter fractions then gain access to a prechamber 32 at the outlet side in the top-mounted housing 6, this prechamber surrounding the hollow shaft 5 and connecting an outlet port 33.

In the embodiment of the invention shown the slurry gains access to the centrifugal separator in substantially the same radial plane in which it leaves the latter, as is evident from FIG. 1. The inlet and outlet ports may, however, also be located in differing radial planes as is explained further on.

As a result of the gravitational effect the separated heavier fractions of the slurry collect in the funnel-shaped bottom portion 2 of the housing 1 from where they can be discharged to the environment via the discharge opening 3 continuously or in suitable time intervals. Preferably, the discharge opening 3 has an adjustable opening width.

Figure 4:
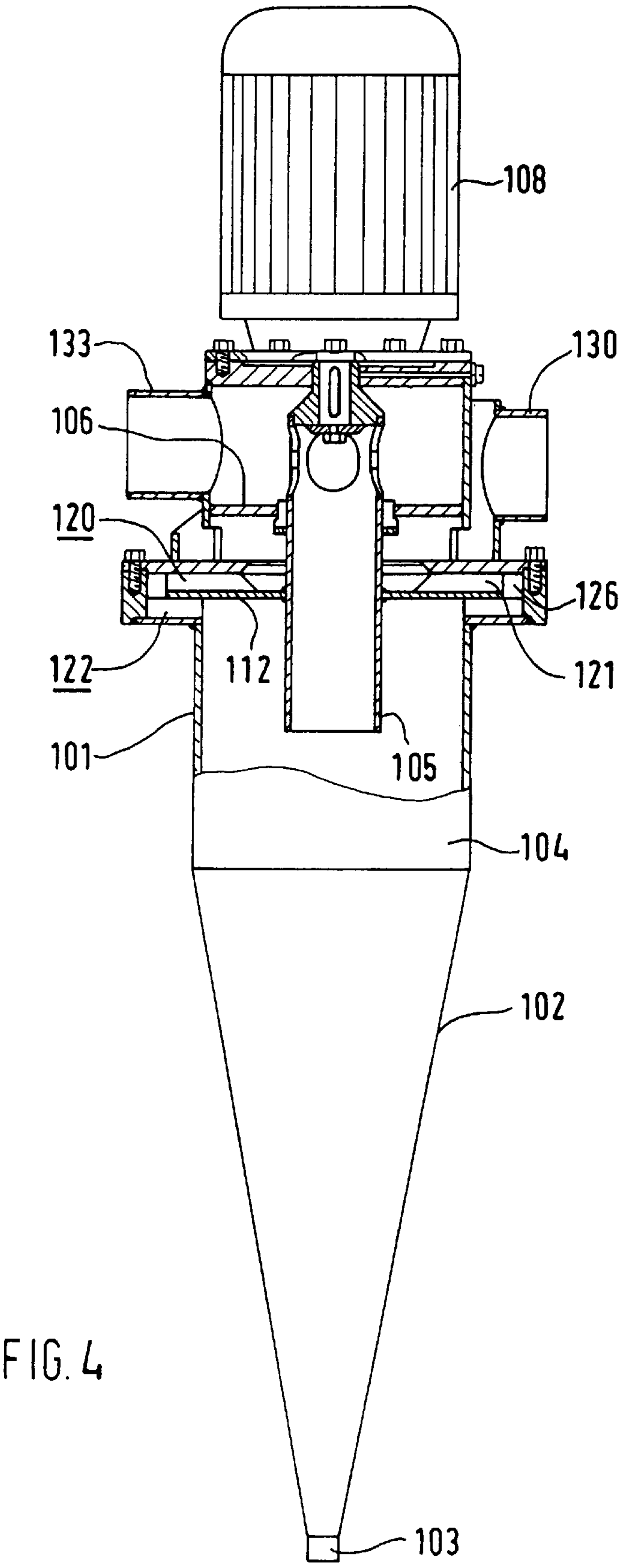
FIG. 4 shows a centrifugal separator according to FIG. 1 in a view similar to that of FIG. 1 in accordance with a second embodiment of the invention.

FIG. 4 shows a modified simplified embodiment of a centrifugal separator in accordance with the invention which is especially suitable for the treatment of slurries having light separable parts or fractions of foreign matter. Components which are the same or similar to those of the embodiment described above are identified by like reference numerals elevated in number by one hundred. This embodiment differs from that described previously substantially by the cyclone rotor means being omitted and accordingly the circulating movement being caused solely by the tangential introduction of the slurry into the separating chamber 104 in conjunction with the overpressure produced by transport rotor means 120 and stator means 122 arranged upstream of the inlet.

As illustrated, the transport rotor means 120 has a modified configuration by the impellers 121 extending only up to the outer circumference of the mounting plate 112 so that on the outer circumference of mounting plate 112 an annular space 126 is defined in the top-mounted housing 106 into which the slurry can flow by the effect of the transport rotor means 120 to gain access to the influencing zone of the stator means 122. It has been found that an improvement in the efficiency of the transport rotor means stator means 120, 122 can be achieved by this modification. If desired, such a modified transport rotor means could also be provided in the embodiment of the invention as shown in FIG. 1.

Furthermore, relative to the embodiment described above the cylindrical section of the housing 101 is shortened by a suitable dimension and the section 102 tapered to the outlet opening 103 is correspondingly lengthened. As regards further details of the configuration reference can be made to FIGS. 1 to 3 and the associated description.

The following relates to embodiments of the centrifugal separators in accordance with the invention which are especially suitable for the floatational fine separation of prefiltered slurries or sludges having, after prefiltering, a remaining fraction of foreign matter, i.e. having a dimension e.g. of 2 mm or less.

Figure 5:
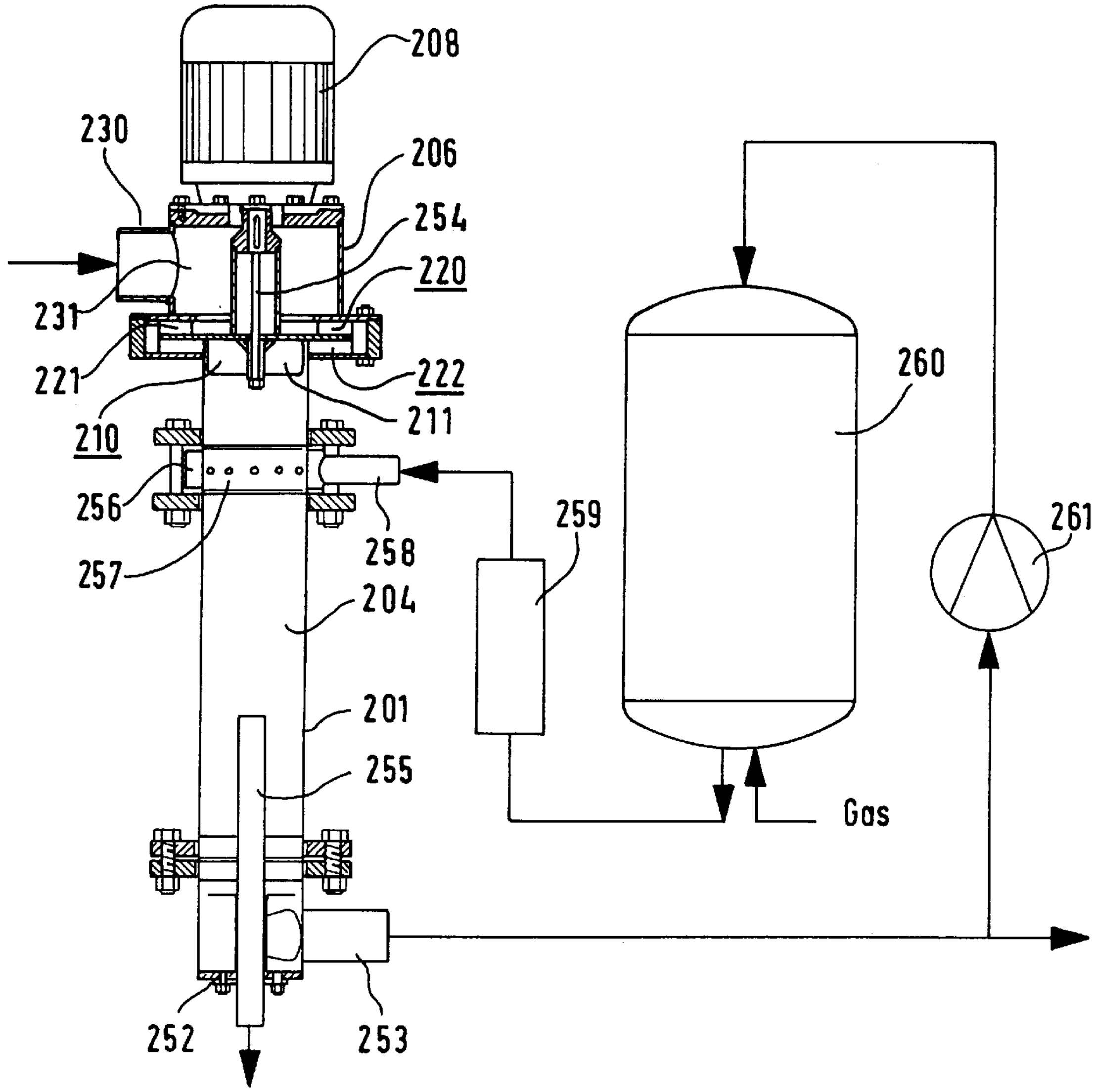
FIG. 5 shows a centrifugal separator in accordance with a third embodiment of the invention.

FIG. 5 shows an embodiment of a floatational centrifugal separator which as regards the configuration of the feeder means for feeding the slurry, consisting of the inlet port 230 and the prechamber 231, the transport rotor means 220 arranged upstream of the inlet in the separating chamber 204 with the stator means 222 for upstream pressurization of the slurry and the cyclone rotor means 210 substantially corresponding to the embodiment in accordance with FIG. 1 so that reference to the latter can be made. Components which are the same or similar to those of the embodiment described above are identified by like reference numerals elevated in number by two hundred.

As illustrated, the transport rotor means 220 and the cyclone rotor means 210 are arranged on a common drive shaft 254 which does not serve simultaneously to discharge a separated fraction of the slurry being treated. Furthermore, relative to the embodiment as shown in FIG. 1 the active surface area of the impellers 211 of the cyclone rotor means 210 can be reduced by the axial dimensions of the impellers being diminished.

As illustrated, the housing 201 is configured cylindrical throughout so that a separating chamber 204 likewise configured cylindrical throughout is formed. A tubular element 255 passing axially through the bottom 252 of the housing 201 and having open ends protrudes into the interior of the separating chamber 204 so that one open end of the tubular element 255 is located suitable spaced away from the bottom 252 of the housing 201, whilst the other open end is arranged outside of the housing 201. Preferably, the tubular element 255 is mounted axially shiftable relative to the housing 201. The tubular element 255 serves to discharge the fine foreign matter fractions of the slurry separated out by means of the floatational separation described in the following.

The liquid or clear output cleaned of the foreign matter can be discharged via an outlet port 253 porting tangential into the separating chamber 204 in the vicinity of the bottom 252 of the housing 201.

At an intermediate axial location of the housing 201, a means for introducing liquid containing a suitable gas, such as air, into the separating chamber 204 are provided. These means comprise an annular distribution conduit 256 surrounding a circumferential portion of the housing 201 in which the housing wall is perforated by perforations 257. Also porting into the distribution conduit 256 is an inlet port 258. The liquid with the gas can thus be directed via the inlet port 258, the distribution conduit 256 and the perforations 257 into the interior of the separating chamber 204.

The liquid involved is preferably one in which the gas is distributed in the form of microbubbles having a dimension of e.g. 100 μm or less. Such liquids saturated with microbubbles may be created e.g. with a relaxation device identified by the reference numeral 259 in FIG. 5 and configured in accordance with DE-3733583 to which reference can be made. The device 259 is connected to a gasification tank 260 into which the liquid to be gasified and a suitable gas can be introduced separately and pressurized.

As a suitable liquid, water may be used. In this respect this may also be, as shown, a branched-off portion of the clear output discharged via the outlet port 253 by the clear output being directed via a pump 261 into the gasification tank 260 where it is charged with the gas and introduced into the device 259 for generating the microgas bubbles.

In the separating chamber 204 the microgas bubbles introduced into the slurry in the manner as described join up with the fine floatational foreign matter fractions of the slurry due to their surface tension, these fines thus collecting preferably in the vicinity of the longitudinal centerline of the centrifugal separator under the influence of the centrifugal forces. The microgas bubbles with the foreign matter fractions adhering thereto can thus be discharged via the central tubular element 255 from the separating chamber 204 whilst the clear output can be output at the outlet port 253.

It is to be noted that instead of a liquid saturated with microgas bubbles the gas could also be directly introduced into the separating chamber 204 to generate gas bubbles in the slurry. To create gas bubbles having a minimum dimension, introducing the gases should be done via a diffusor ring (not shown) made of a fine-grain sintered metal which would have to be provided in place of the distribution conduit 256.

Furthermore, the cyclone rotor means 210 could be omitted so that the circulating movement of the slurry, similar to the embodiment as shown in FIG. 4, would be based solely on the pressure-increasing effect of the interaction of the transport rotor means and stator means 220, 222 and the tangential introduction of the slurry into the separating chamber 204.

Furthermore, discharge of the microgas bubbles with the foreign matter adhering thereto could result, similar to the means as described for the embodiment of the invention as shown in FIGS. 1 and 4, via a central hollow shaft contrary to the gravitational effect, this hollow shaft simultaneously representing the common axis of rotation of the transport rotor means 220 and the cyclone rotor means 210.

Figure 6:
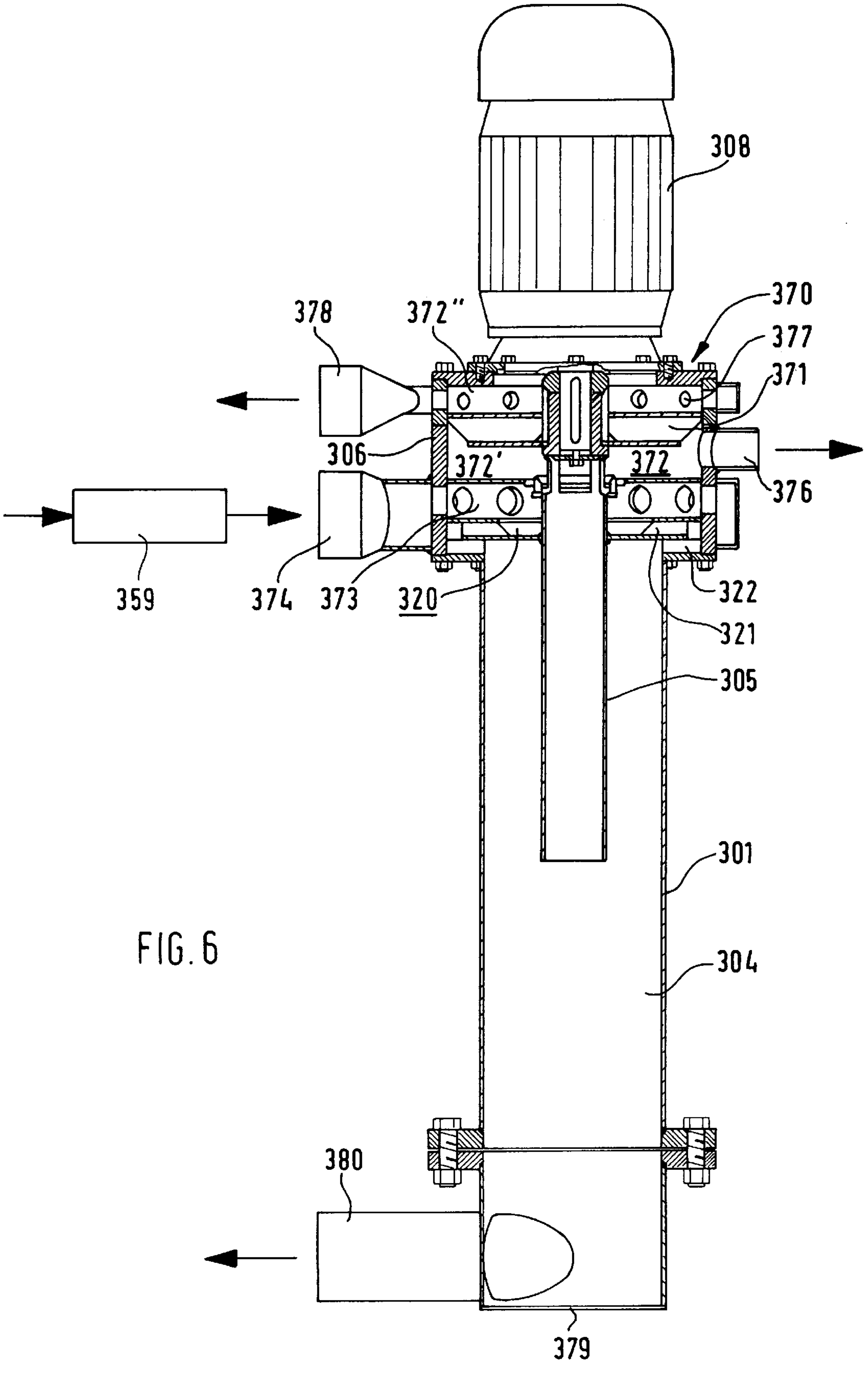
FIG. 6 shows a centrifugal separator for floatational separation in accordance with a fourth embodiment of the invention.

FIG. 6 shows a floatational centrifugal separator in accordance with a fourth embodiment of the invention. Components which are the same or similar to those of the embodiments described above are identified by like reference numerals elevated in number by three hundred. This fourth embodiment of the invention comprises a housing 301 cylindrical throughout, defining a separating chamber 304 likewise cylindrical throughout. Upstream of an inlet into the separating chamber 304, a transport rotor means 320 and a stator means 322 cooperating therewith are provided for pressurizing the slurry, the configuration and functioning of these means corresponding to those of the embodiment as shown in FIG. 1 so that a repeat description can be dispensed with. Similar to the embodiment as shown in FIG. 4 a cyclone rotor means is omitted.

One feature of the centrifugal separator as shown in FIG. 6 is an foam destroying means identified in general by the reference numeral 370. This foam destroying means 370 comprises a plurality of impellers 371 rotatable about a central axis which preferably coincides with the rotational axis of the impellers 321 of the transport rotor means 320, these impellers being arranged in a space 372 in a top-mounted housing 306 disposed above the separator housing 301. The space 372 is disposed above a space 373 in the top-mounted housing 369 containing the transport rotor means 320 and the stator means 322, the slurry to be treated being able to be introduced via an inlet port 374 into this space 373. More particularly, a slurry in which microgas bubbles are dispersed may be introduced via the inlet port 374. These microgas bubbles may be introduced into the slurry, as is indicated at 359, by means of a device as already described in conjunction with the embodiment as shown in FIG. 5.

The spaces 372 and 373 in the top-mounted housing 369 are sealed off from each other, and furthermore, the upper space 372 is divided into a lower portion 372' containing the impellers 371 of the foam destroying means 370 and an upper portion 372" which in the vicinity of the hollow shaft 305 fluidly communicates with the lower portion 372'. Porting into the lower portion 372' is a foreign matter outlet port 376. The circumferential wall of the top-mounted housing 369 is perforated along the upper portion 372" by a plurality of peripherally distributed perforations 377 which connect the interior of the upper portion 372" to a gas outlet port 378 to enable the gaseous fractions removed from the separated foreign matter to be discharged to the environment.

As already mentioned, the impellers 371 of the foam destroying means 370 may be mounted on the same axis of rotation as that of the impellers 321 of the transport rotor means 320. This axis of rotation is configured as a hollow shaft 305 protruding axially into the separating chamber 304 and having a lower open end into which the separated foreign matter adhering to the gas bubbles can enter, from where they rise in the interior of the hollow shaft 305 and gain access to the space 372 of the foam destroying means 370 and thus to the influencing zone of the impellers 371.

A tangential porting discharge port 380 in the vicinity of the bottom 379 of the separator housing 301 serves to discharge the liquid fractions of the slurry or clear output free of foreign matter.

In the foam destroying means 370 the foreign matter adhering to the gas bubbles gaining access to the space 372 is caused to execute a circulating movement by the impellers 371 so that the heavier foreign matter is separated from the gas bubbles by the centrifugal effects and collects at the inner circumference of the lower space portion 372', whereas the gas bubbles ascend upwards into the upper space portion 372" from which they can be discharged to the environment as already described.

Instead of introducing a pregassified slurry via the inlet port 374 the slurry could also be treated in the separating chamber 304 in the presence of gas bubbles by the gas being introduced into the separating chamber 304 separately from slurry in accordance with the embodiment as shown in FIG. 5.

Furthermore, if desired, a cyclone rotor means similar to the embodiment of the invention as shown in FIG. 1 may be provided. In this case the impellers 371 of the foam destroying means 370, the impellers 321 of the transport rotor means 320 and the impellers of the added cyclone rotor means could be mounted in sequence on the driven hollow shaft 305 for common rotation by the drive means 308. It will be appreciated that similar to the embodiments of the invention as described above independent drive shafts for driving said impellers may be provided.

What is claimed is:

1. A method for separating heavier from lighter parts of aqueous slurries by means of centrifugal force effects, in which under the influence of a pressure gradient existing between an inlet and outlet of a cyclone separating chamber the slurry is caused to execute a circulating movement in said cyclone separating chamber so that the lighter parts separate from the heavier parts of the slurry, and the heavier and lighter parts are separately discharged from the separating chamber, wherein said pressure gradient is produced by a pressure boosting stage substantially immediately prior to the introduction of the slurry into said cyclone separating chamber, and wherein, for increasing the pressure, the slurry is accelerated upstream of the location of its introduction into said cyclone separating chamber from a radially inward location to a radially outward location, decelerated in the vicinity of said radially outward location and deflected to flow in a direction towards said location of introduction.

2. The method as set forth in claim 1, wherein the separation of the slurry is done in the presence of gas bubbles.

3. The method as set forth in claim 2, wherein a liquid saturated with microgas bubbles is introduced into the cyclone separating chamber to mix with the slurry therein.

4. The method as set forth in claim 2, wherein the slurry is pressure-gasified, relaxed by forming microgas bubbles, and introduced into the separating chamber in a gasified condition.

5. The method as set forth in claim 1, wherein said slurry is introduced into said cyclone separating chamber in a substantially tangential manner.

6. The method as set forth in claim 1, wherein additional rotative energy is introduced into the slurry present in said cyclone separating chamber.

7. A centrifugal separator device for separating heavier from lighter parts of aqueous slurries by means of centrifugal force effects including a cyclone separating chamber, means for generating a pressure gradient between an inlet and outlet of said cyclone separating chamber so that said slurry is caused to execute a circulating movement in said cyclone separating chamber, means for discharging from said cyclone separating chamber the lighter parts, and means for discharging from said cyclone separating chamber the heavier parts of the slurry, wherein said means for generating the pressure gradient comprising a transport rotor means rotatably driven about an axis of rotation is accomodated in a first chamber which is provided in a top-mounted housing of said separator device and has a radial dimension greater than the radial dimension of the cyclone separating chamber, and said transport rotor means cooperating with a stator means also provided in said first chamber adjacent the inlet of said cyclone separating chamber to expose said slurry to an overpressure substantially directly prior to its introduction into said cyclone separating chamber.

8. The centrifugal separator device as set forth in claim 7, further including means for introducing gas bubbles into said cyclone separating chamber.

9. The centrifugal separator device as set forth in claim 8, further including foam destroying means arranged axial spaced from said transport rotor means and having rotationally driven impellers for separation by means of centrifugal force effects foreign matter adhering to the gas bubbles from a foaming gas bubble/foreign matter mixture discharged from the separating chamber.

10. The centrifugal separator device as set forth in claim 9, wherein the impellers of said foam destroying means and the impellers of said transport means are driven by the same shaft of rotation.

11. The centrifugal separator device as set forth in claim 8, wherein said means for introducing gas bubbles comprises a gasification tank for introducing a gas into a liquid and a relaxation device in fluid communication with said gasification tank for producing microgas bubbles in the gasified liquid.

12. The centrifugal separator device as set forth in claim 7, wherein a cyclone rotor means is arranged in the cyclone separating chamber for introducing additional rotative energy into the slurry, said cyclone rotor means being driven by the same shaft of rotation as that of the transport rotor means.

13. The centrifugal separator device as set forth in claim 7, wherein the ratio of the radial dimension of said transport rotor means to the radial dimension of said cyclone separating chamber is between about 1.25:1 to 1.75:1.

* * * * *